United States Patent [19]

Rosenthal

[11] 4,145,386

[45] Mar. 20, 1979

[54] METHOD FOR THE SURFACE TREATMENT OF THERMOPLASTIC MATERIALS

[75] Inventor: Louis A. Rosenthal, Highland Park, N.J.

[73] Assignee: Union Carbide Corporation, New York, N.Y.

[21] Appl. No.: 811,309

[22] Filed: Jun. 29, 1977

[51] Int. Cl.[2] .......................... B29D 3/00; H05B 7/16

[52] U.S. Cl. .......................... 264/22; 204/224 M; 219/69 E

[58] Field of Search .......................... 264/22; 204/224 M; 219/69 E

[56] References Cited

U.S. PATENT DOCUMENTS

| | | | |
|---|---|---|---|
| 3,485,744 | 12/1969 | Schaffner | 204/224 M X |
| 3,573,176 | 3/1971 | Laznovsky | 204/224 M X |
| 3,696,014 | 10/1972 | Goodard et al. | 204/224 M X |
| 3,779,882 | 12/1973 | Rosenthal | 204/165 |
| 3,903,426 | 9/1975 | Lowther | 204/176 X |
| 3,954,586 | 5/1976 | Lowther | 204/176 |

*Primary Examiner*—Philip Anderson
*Attorney, Agent, or Firm*—Gerald R. O'Brien, Jr.

[57] ABSTRACT

In the corona discharge surface treatment of a continuum of thermoplastic material passed through an air gap between stationary and roller electrodes across which a high voltage is impressed, the improvement which comprises employing as said stationary electrode a metallic substrate of high electrical conductivity and a continuous coating layer of porcelain enamel dielectric material.

3 Claims, 6 Drawing Figures

FIG. 1
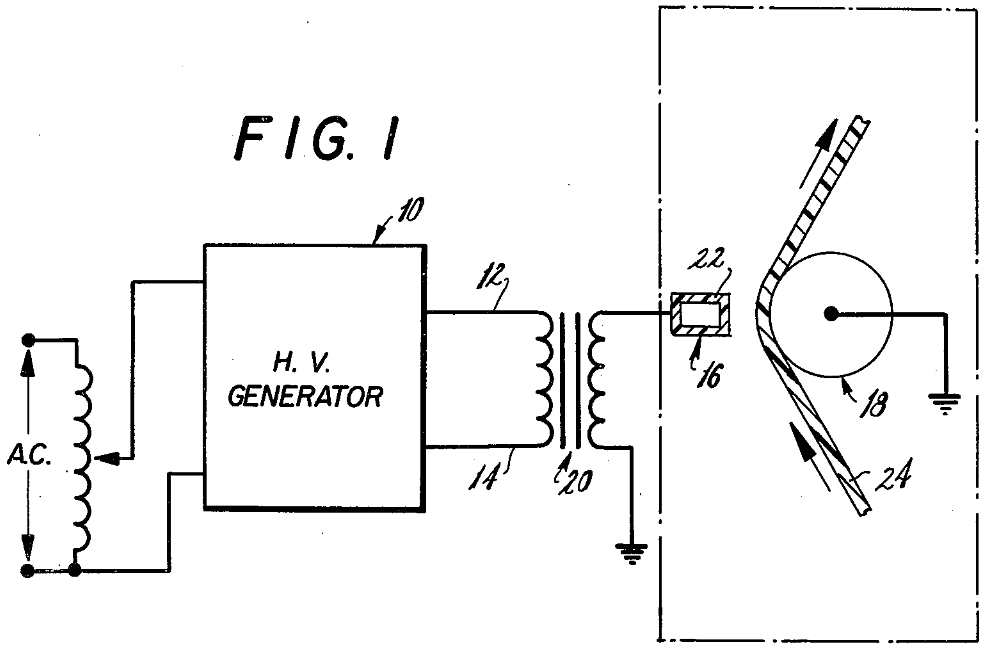
FIG. 2
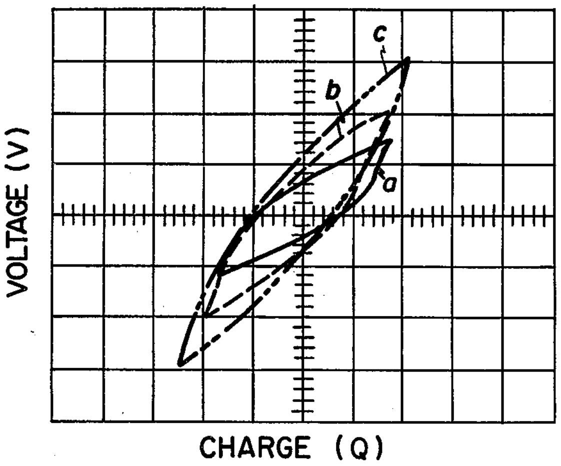
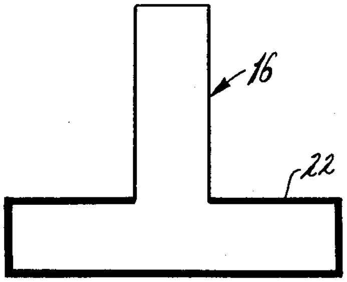
FIG. 3
FIG. 4
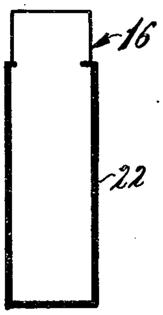
FIG. 5
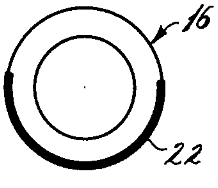
FIG. 6
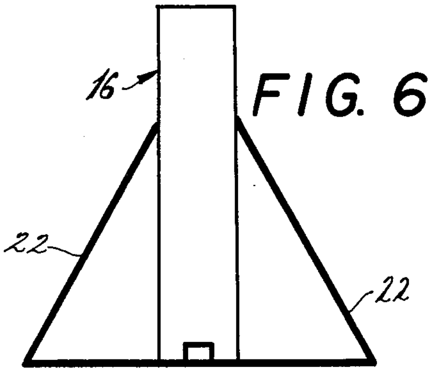

METHOD FOR THE SURFACE TREATMENT OF THERMOPLASTIC MATERIALS

The present invention relates to the corona discharge surface treatment of thermoplastic materials and, more particularly, to such treatment of surfaces of thermoplastic material bodies to improve their adhesion to printing inks, paints, coatings, and bodies of other materials.

Heretofore, many methods for the continuous corona discharge surface treatment of thermoplastic materials have been employed wherein the material continuum is passed through an air gap between stationary and roller electrodes. Such a system is both shown and described on page 328 of the IEEE article discussed herebelow. The stationary electrode is typically a bar or cluster of bars and the relatively large roller electrode is coated with dielectric coating. A high voltage, of the order of 20KV at 10kHz, is typically impressed across the electrodes. A corona arc discharge is developed in the gap and produces surface treatment of the thermoplastic material continuum which results in the promotion of excellent adhesion properties on the surface of the treated continuum. However, the provision and maintenance of such dielectric coatings on such roller electrodes which support the material to be treated present a number of problems which result in operational difficulties.

The dielectric roller coating is a major factor in good performance of this treatment process. Several qualities are sought for the reasons indicated below.

1. The capacitance per unit area must be high and this requires a high $\epsilon/t$ ratio where $\epsilon$ is the dielectric constant and t is the thickness. Corona power is directly proportional to capacitance per unit area.

2. The buffer must have a high dielectric strength (i.e., volts/mil = $E_{max}$; an electric field) since this surface may experience the full applied electrode voltage and large working voltages correspond to large corona powers.

3. The roller coating should be capable of dissipating the heat generated, unaffected by ozone and oxides of nitrogen, and mechanically tough.

Catastrophic failure of a roller can result in costly production losses. Replacement of a roller and shipment out of plant for recoating is expensive. To this day the ideal roller coating material has not been found. "Hypalon" has found wide usage because there are many locations where new coatings can be applied, and the life is tolerable because of its ozone resistance. "Hypalon" is a commercial synthetic rubber sold by E. I. duPont. Epoxy systems, filled and unfilled, can perform well but the application is a difficult process. Glass coated rollers are excellent but for their fragility and difficulty in application.

It is, therefore, the prime object of the present invention to provide a continuous corona discharge surface treatment system having an electrode system capable of sustaining long use without exhibiting the above-stated difficulties of the prior art systems.

In considering the problems of the prior art systems, it has been discovered that, by removing the dielectric coating from the roller which transports the film in a corona continuous film treating operation and placing this dielectric on the stationary electrode, certain discharge treating process improvements result. The expensive roller coatings and the cost of replacements and handling are eliminated and responsibility as the buffer dielectric is transferred to the stationary high voltage electrode. With the advent of new superior ceramic dielectric materials, such as disclosed and claimed in U.S. Pat. No. 3,903,426 to F. E. Lowther, capable of operating at high temperatures continuously without deterioration, this buffered stationary electrode becomes a reality. Such porcelain materials provide the dielectric performance and strength required. A top surface coating of a plasma coated refractory ceramic material offers additional improvements by:

1. providing a tough mechanical surface that precludes abrasion;

2. offering thermal equalization and conductivity; and 3. producing electrical stress equalization due to the different dielectric properties of the surface layer.

There are certain other advantages in treating the film over a bare metal roller. Heat buildup in the "Hypalon" dielectric coated roller can result in deleterious effects on oriented films. Good thermal conductivity of the film to the roller will control the treating efficacy and the film properties. The treatment of metal foils for laminating and conducting surfaces can be realized with great convenience.

In accordance with the present invention, in a process for the corona discharge surface treatment of thermoplastic material, wherein a continuum of material is passed through an air gap between stationary and roller electrodes across which a high voltage is impressed, the improvement which comprises employing, as the stationary electrode, a metallic substrate of high electrical conductivity having a continuous coating layer of porcelain enamel dielectric material.

It has been found that the metallic substrate of the stationary electrode may be comprised of a wide variety of metals such as steel. It should be noted, however, that such material should be selected to avoid a material which will permit spalling or gas evolution from the substrate and consequent disruption of the surface and dielectric characteristics of the porcelain enamel outer coating. For this reason, when employing steel as the stationary electrode substrate material, it is preferred to employ a decarburized steel, rather than ordinary low-carbon steel.

The porcelain enamel dielectric material coating layer of the stationary electrode may consist of any one of a wide variety of such materials well known to the art. A uniform coating layer of such materials may similarly be applied by well known prior art techniques. The firing of the applied coating layer materials to form the coating layer may be carried out by the application of known direct or indirect heating techniques to form the fused coating layer. Temperatures of the order of 1500° F. or above are typical for such firing applications. Coating layers of uniform thicknesses of the order of 5–20 mils are readily achievable. The analysis of one such porcelain enamel composition which may be employed to form the coating layer useful in the process of the present invention is set forth in columns 16–18 of U.S. Pat. No. 3,954,586 to F. E. Lowther.

It has additionally been found that an outer continuous protective shielding and reinforcing layer of refractory material may be applied to the porcelain enamel dielectric layer of the stationary electrode. This outer refractory layer may comprise any one or more of a wide variety of refractory inorganic metal compounds, such as refractory metal oxides, nitrides, carbides and borides which have long been employed in the art to impart high temperature strength, wear resistance, shock resistance and other such properties when applied as protective or shielding coatings. Such coatings normally possess good high thermal conductivity properties which are here desired to prevent the buildup of heat in the stationary electrode.

It has further been found that the dielectrically coated stationary electrode system of the invention (i.e. inverted system), when the porcelain enamel dielectric coated stationary electrode is coated with an outer refractory metal compound coating, presents a superior system from the standpoints of physical strength and protection of the dielectric coating and oxidation resistance of the dielectric coating. The mere provision of multi-layered coatings also serves to make the corona voltage distribution more uniform, as is desirable. Finally, the prior art processes, which provide a refractory coating in a discontinuous metal matrix with lamellar distribution of the refractory material, serve to make the coating layer even more thermally but not electrically conductive, as is desirable. The flame detonation process and plasma arc process are examples of processes capable of producing such refractory coatings. Such processes are disclosed in U.S. Pat. Nos. 2,174,563 and 3,016,447, respectively.

In the drawing:

FIG. 1 is a schematic view of corona discharge film treating apparatus suitable for employment in the practice of the process of the invention;

FIG. 2 is a plot of charge-voltage of electrical energy input employing different electrodes; and FIGS. 3–6 are schematic sectional views showing a variety of stationary electrode configurations employable in the process of the invention.

Referring specifically to the embodiment of FIG. 1 of the drawing, generator 10 is provided, having conductors 12 and 14 for energizing treating electrodes 16 and 18, respectively, through transformer 20. Treating electrode 16 is a stationary electrode having an outer dielectric coating 22. Electrode 18 is a grounded roller electrode.

The continuum (film or sheet) of thermoplastic material to be treated 24 is positioned in contact with the grounded roller electrode 18.

An experimental program was carried out, wherein a section of each bar, typically 8 inches, was tested by a shortened ground plane. In a step-wise manner, power expressed as watts per inch was increased until failure. At each level, 30 minutes was allowed for thermal equilibrium. It was considered that 20 watts/linear inch of electrode represented a top level for power input.

A summary of final performance is as follows:

| Bar No. | Material Over 15 Mils Porcelain | Voltage Level Mix | Watts/Linear Inch |
|---|---|---|---|
| 1 | 15 mils $Al_2O_3$ | 11.5 kv | 37 watts/inch |
| 2 | 10 mils $Al_2O_3$ | 10.0 kv | 32 watts/inch |
| 3 | 5 mils $Al_2O_3$ | 9.5 kv | 33 watts/inch |
| 4 | 0 (only porcelain) | 9.75 kv | 28 watts/inch |

As a point of interest, the bar temperature for the last case (No. 4) was 136° C. The complete test at 30 minutes/step generally lasted over three hours and as the bar heated up it was necessary to reduce the peak voltage. From the data presented, the presence of the plasma arc outer coated $Al_2O_3$ composition layer does influence the maximum applied voltage at the point of failure. It appears that the thickness of the aluminum oxide coating is not very important and the electrical performance improvement over the bare porcelain case is small. The strength and protective shielding properties were, however, greatly enhanced.

One bar, which has 15 mils of $Al_2O_3$ over porcelain, has been operated for 6½ hours at 60 volts and 3.4 amps (i.e., 200 watts or 10 watts/inch). The peak voltage was 10 kv. This power level of operation is average for a commercial system. The bar was not tested to failure, but subsequently employed to treat film.

Low density polyethylene film was treated using bar No. 10 (15 mils of plasma arc coated aluminum oxide composition). Film was passed at 30 feet/minute on 50 square feet/minute under an electrode and the following treatment performance was observed.

| Electrode Power | Watt Minutes/Sq. ft | Treatment Dyne/Cm. |
|---|---|---|
| 50 | 1 | 37 |
| 100 | 2 | 39 |
| 150 | 3 | 46 |

Ink adhesion was good in all cases. This performance is typically commercial and completely satisfactory as compared to any known method of film treatment.

A series of three tests was conducted to measure the electrical energy input to the electrode by means of charge-voltage plots. Such plots have been described by Rosenthal and Davis in the article "Electrical Characterization of a Corona Discharge for Surface Treatment," *IEEE Transactions on Industry Applications*, Vol. IA-11, No. 3, pp. 328–335. In all cases the inverter current is 1.5 amperes. Identical lengths (8") of bare porcelain and porcelain coated with 15 mils of outer plasma coated $Al_2O_3$, and bare porcelain over "Hypalon" (curve "c") are compared as the parallelograms of FIG. 2. Areas of these traces are energy in joules per cycle and the energy partition between the air gap and the dielectric buffer is not provided. The bare porcelain trace (curve "a") is the most ideal corona phase portrait. Clearly, the presence of the $Al_2O_3$ coating (curve "b") provided the higher voltage drop at the same charge excursion (horizontal excursion). The curvature of the long parallel sides is characteristically a measure of the dielectric buffer losses and thelosses corresponding to a larger area may partly go into the plasma coating.

For all of the electrode configurations to be described, the superior porcelain dielectrics based on the above-stated teachings are fundamental. These must be applied to a decarburized surface to provide a basic two-layer system. In the case of large solid electrodes, this decarburized face must be an integral part of the electrode. A third layer consisting of a plasma arc or flame sprayed ceramic coating of a material such as ($Al_2O_3$) alumina, beryllia, or zirconium oxide, primarily provides the mechanical integrity of the system. The porcelain layer can be 10–15 mils and the plasma arc refractory coating can be 5 to 10 mils. All coatings must be free of pinholes and entrapped impurities and so offer the most superior electrical properties.

A variety of geometries are shown in the accompanying figures. The following basic guidelines apply in any electrode design:

1. The structure must be rigid to maintain gap dimensions during large temperature excursions.

2. Good thermal coupling or low thermal resistance from the electrode surface to the support bar must be maintained. The use of thermal grease and holding magnets offer possibilities.

3. A long electrical path should exist so that the corona discharge does not surface backfire onto the uninsulated portions of the electrode.

4. The end of the electrode must be plugged so that no exposed inner surfaces are available. Dielectric plugs made of mica loaded glasses (e.g., "Mycalex" sold by Mycalex Corporation of America) can be used.

5. The plasma coating process is more amenable to cylindrical geometrics.

6. For shoe (large surface) electrodes a top operating level of corona power is approximately 40 watts per square inch.

7. In the cases of segmented electrodes the gap between the adjacent segments can result in reduced treatment intensity. Therefore, electrodes should either be skewed or for two rows, staggered.

8. All corners should be reduced to ⅛" radii.

In FIG. 3 there is shown a "T" bar arrangement with improved rigidigy and long electrical paths. If the laminated electrode is of the slip-on variety and the "T" bar is only the support mechanism, provisions must be made to seal the ends.

In FIG. 4, the bar electrode shown has a trough or channel that is the virtual electrode surface. Thermal grease should be used to improve the heat transfer. By using a channel electrode, the support bar becomes noncritical.

In FIG. 5, a cylindrical geometry is shown. The support rod can be hollow and cooled by the passage of air.

FIG. 6 shows a shoe electrode snapping onto a support rod. It is an extension of the goemetry shown in FIG. 3.

A segmented electrode arrangement with skewed axis electrode segments (not shown) may alternatively be employed. The advantage of skewing is that the segment gap is not in the film travel direction. If not skewed, then two rows of electrodes can be used in a staggered mode. Segmented electrodes are becoming increasingly popular in various specialty treating applications.

As a practical consideration, a simple bar configuration in 2", 4", 8", 10" and 20" lengths, provided for simple assembly in an existing frame, can provide the flexibility required for the practice of the invention.

What is claimed is:

1. In a process for the corona discharge surface treatment of thermoplastic material, wherein a continuum of said material is passed through an air gap between stationary bar type and relatively large roller type electrodes across which high voltage is impressed, the improvement which comprises employing, as said stationary bar type electrode, a metallic substrate of high electrical conductivity having a continuous coating layer of porcelain enamel dielectric material; and an outer continuous shielding layer of material thereover consisting essentially of at least one member selected from the group consisting of refractory metal oxides, nitrides, carbides and borides having properties of high mechanical strength, chemical stability at elevated temperatures and high thermal conductivity.

2. The process as claimed in claim 1, wherein said continuum of thermoplastic material to be treated is maintained during treatment in contact with said roller electrode and spaced from said stationary electrode to provide an air gap therebetween.

3. The process as claimed in claim 2, wherein said outer continuous shielding layer consists essentially of aluminum oxide.

* * * * *